United States Patent
Naito

[11] 3,842,411
[45] Oct. 15, 1974

[54] DRIVING CIRCUIT FOR A DISPLAY DEVICE

[75] Inventor: Okito Naito, Suwa, Japan

[73] Assignee: Kabushiki Kaisha Suwa Seikosha, Tokyo, Japan

[22] Filed: Nov. 23, 1971

[21] Appl. No.: 203,104

[30] Foreign Application Priority Data
Nov. 25, 1970   Japan............................... 45-103297

[52] U.S. Cl.................. 340/332, 58/50 R, 307/251, 350/160 LC
[51] Int. Cl.............................................. G08b 5/36
[58] Field of Search.......... 340/324 R, 166 EL, 332; 350/160 LC; 58/50 R; 307/251

[56] References Cited
UNITED STATES PATENTS

| | | |
|---|---|---|
| 3,575,491 | 4/1971 | Heilmeier ..................... 350/160 LC |
| 3,575,492 | 4/1971 | Nester et al. ................. 350/160 LC |
| 3,613,351 | 10/1971 | Walton ................................. 58/23 |
| 3,653,745 | 4/1972 | Mao............................. 350/160 LC |
| 3,654,606 | 4/1972 | Marlowe et al............... 340/166 EL |
| 3,672,155 | 6/1972 | Bergey et al........................ 58/50 R |

*Primary Examiner*—David L. Trafton
*Attorney, Agent, or Firm*—Blum Moscovitz Friedman & Kaplan

[57] ABSTRACT

A driving circuit for a liquid crystal display device formed from MOS transistors, wherein a low voltage input signal switches the state of said driving circuit to apply a relatively high voltage to the liquid crystal display device. The driving circuit may include a COSMOS inverter.

4 Claims, 4 Drawing Figures

PATENTED OCT 15 1974

3,842,411

DRIVING CIRCUIT FOR A DISPLAY DEVICE

BACKGROUND OF THE INVENTION

This invention relates to liquid crystal display devices, and more particularly to driving circuits for such liquid crystal display devices. Liquid crystal display devices are well known in the art, generally including a pair of spaced plates having conductive layers deposited on the opposed facing surfaces thereof, and having a layer of liquid crystal material retained therebetween. The molecular alignment of the liquid crystal material is changed upon the application of an electric field thereto, as by the application of a voltage between said conductive layers. At least one of said plates and the conductive layer thereon is transparent, display being effected by the affect of the region of the liquid crystal material having an electric field applied thereto on transmitted or reflected light.

In the art, the voltage applied to the conductive layers of such liquid crystal devices has generally been switched by active elements such as bipolar type transistors and the like, as in the case of the switching of light emitting diodes. However, the impedance of liquid crystal devices is considerably higher than that of light emitting diodes. Thus, the impedance of a single display segment of a liquid crystal device is more than 500 to 1,000 Mohms. For this reason, liquid crystal devices are slightly lit even when the driving transistor is switched to the "off" mode, so that active elements such as bipolar type transistors are not particularly adapted for switching liquid crystal devices. While the foregoing defect may be avoided by connecting a load element in parallel to the liquid crystal device, such an expedient is inconvenient where the liquid crystal display device is to be incorporated in a wrist watch, such as a quartz crystal wrist watch, due to the relatively high power consumption of such an arrangement.

SUMMARY OF THE INVENTION

Generally speaking, in accordance with the invention, a driving circuit for a liquid crystal display device is provided comprising switching circuit means formed from MOS transistors and adapted to apply a relatively high voltage to said liquid crystal display device upon the application of a relativaly low voltage thereto. Said switching circuit means includes a COS-MOS inverter having a P-MOS transistor and an N-MOS transistor coupled together in a complementary symmetry circuit. The liquid crystal display device would be connected between the drain and source electrodes of said P-MOS transistor or between the source and drain electrodes of said N-MOS transistor.

In a further embodiment, a pair of said COS-MOS inverters are connected between the terminals of a relatively high voltage power source, said liquid crystal display device being connected between one of the terminals of said high voltage device and both the input of one of said pair of inverters and the output of the other of said pair of inverters. The driving circuit includes a third inverter having a relatively low voltage source connected in the source-drain path thereof and a control MOS transistor connected by its source and drain electrodes to each of said inverters, the gate electrodes of each of said control transistors being connected respectively to one of the input and output of said third inverter.

Accordingly, the object of the present invention is to provide a driving circuit for liquid crystal display devices having low power consumption, and particularly suitable for application in wrist watches.

Still other objects and advantages of the invention will in part be obvious and will in part be apparent from the specification and drawing.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

BRIEF DESCRIPTION OF THE PREFERRED EMBODIMENTS

Figure 1:
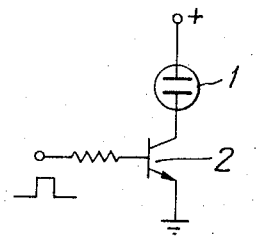
FIGS. 1 and 2 are circuit diagrams of prior art driving circuits for liquid crystal display devices.
Figure 2:
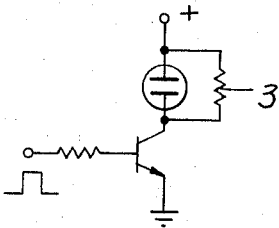

Referring now to FIG. 1, the prior art driving circuit for liquid crystal devices consists of a liquid crystal display device 1 connected in the emitter-collector path of a switching transistor 2. A second prior art arrangement is depicted in FIG. 2, wherein a resistive load impedance is connected in parallel to the liquid crystal display device, but in other respects, the circuit is identical to the circuit of FIG. 1. As noted above, the arrangement of FIG. 1, which is switched in response to a pulse signal applied to the base of transistor 2, has the disadvantage of not completely cutting off the liquid crystal display device 1. While the embodiment of FIG. 2 cures this defect, said circuit results in relatively high power consumption, a result not acceptable where the circuit is to be incorporated in a low power device such as a wrist watch.

Figure 3:
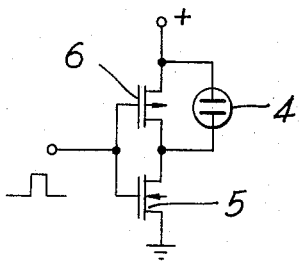
FIG. 3 is a circuit diagram of a driving circuit for liquid crystal display devices according to the invention.

Referring now to FIG. 3, the driving circuit according to the invention is depicted. Said driving circuit consists of a N-MOS (N channel-Metal Oxide-Semiconductor) 5 and a P-MOS (P channel-MOS) 6. Said MOS transistors are connected in series in the configuration of a COS (Complementary Symmetry) circuit with liquid crystal display device 4 connected between the drain and source electrodes of P-MOS transistor 6 as a load. When N-MOS transistor 5 is switched on by an input signal of positive polarity, liquid crystal cell 4 is excited, while P-MOS transistor 6 is switched off so that the electric power consumption of the display device is very low. P-MOS transistor 6 is switched on when the gate potential thereof is at zero voltage, thereby short circuiting liquid crystal display device 4, while N-MOS transistor 5 is switched off. In this condition, liquid crystal display device 4 is not excited. It is easy to produce an integrated circuit using complementary MOS transistors in the above-described configuration for driving a liquid crystal display device. Where a wrist watch is provided with such a driving circuit, the display device thereof can be operated at an extremely low power consumption level.

Figure 4:
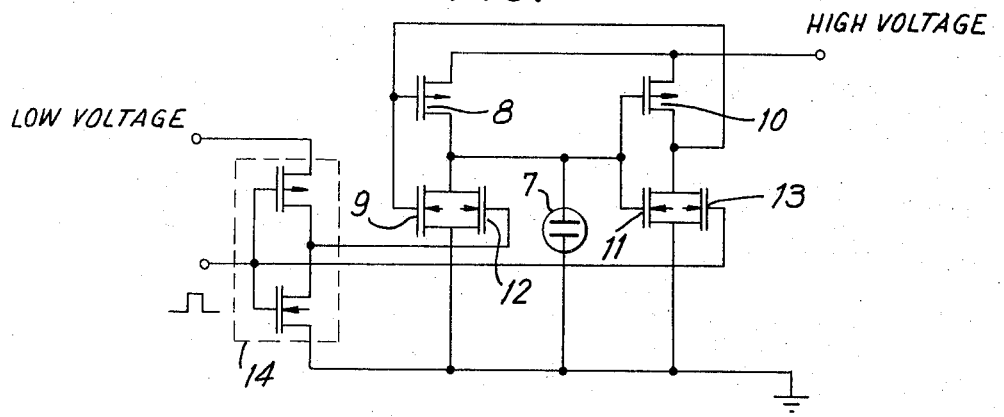
FIG. 4 is a circuit diagram of a second embodiment of a driving circuit for liquid crystal display devices according to the invention.

Referring now to FIG. 4, a second embodiment of the driving circuit according to the invention particularly adapted for application to wrist watches is depicted. Said circuits include a P-MOS transistor 8 and a N-MOS transistor 9 coupled in the configuration of a COS circuit and defining an inverter. Also defining an inverter and similarly coupled are P-MOS transistor 10 and N-MOS transistor 11. The gate electrodes of MOS transistors 8 and 9 are coupled to the drain electrodes of MOS transistors 10 and 11, while the gate electrodes of the latter transistors are connected to the drain electrodes of MOS transistors 8 and 9. The source electrodes of each of MOS transistors 8 and 10 are connected to the high voltage supply. A control N-MOS transistor 12 is connected by its drain and source electrodes to the source and drain electrodes of MOS transistor 9. Similarly, a control N-MOS transistor 13 is connected by its drain and sourse electrodes to the source and drain electrodes of N-MOS transistor 11. An inverter circuit 14, also formed from a N-MOS transistor and a P-MOS transistor coupled in the configuration of a COS circuit is also provided. The gate electrodes of control transistor 12 is connected to the output of inverter 14 while the gate of control transistor 13 is connected to the input of inverter 14. A low voltage source is coupled to the source-drain path of said inverter circuit, the input driving pulse being applied to the input of inverter circuit 14. The voltage source of a wrist watch should be as low as possible because of the minimum volume available within the wrist watch. The relatively high voltage required for driving the liquid crystal display device 7, which is connected between the ground terminal of the high voltage source and the common connection defining the output of the inverter formed by transistors 8 and 9 and the input of the inverter defined by transistors 10 and 11, is obtained by transforming up the voltage of the low voltage source. A high voltage is required for driving the display device in order to economize in power consumption. The foregoing arrangement offers substantial advantages, since relatively low voltages are utilized in the divider circuit which reduces the frequency output of the quartz crystal of a wrist watch, as compared with the voltage utilized to drive the liquid crystal.

The driving circuit of FIG. 4 operates in response to a positive voltage applied to the input of inverter circuit 14. In response to said positive voltage, N-MOS transistors 11 and 13 are turned on, and N-MOS transistors 9 and 12 are turned off. P-MOS transistor 8 is turned on and P-MOS transistor 10 is turned off. Since P-MOS transistor 8 is turned on, liquid crystal 7 is excited. When the input electric potential becomes zero, N-MOS transistors 9 and 12 are turned on, short circuiting liquid crystal display device 7, so that said liquid crystal display device is not excited. Further, since P-MOS transistor 8 is cut off, power consumption is extremely small.

The driving circuits according to the invention using MOS active elements can be integrated and miniaturized, and are particularly suitable for application to wrist watches operated at low voltages. Further, they are particularly adapted for application to wrist watches having liquid crystal display devices of high impedance.

While the foregoing embodiments disclose a driving circuit according to the invention activated by positive pulses, the circuit according to the invention may be activated by negative pulses, in which case the connection of the liquid crystal is simply changed.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A driving circuit for selectively coupling a display device to a source of high voltage in response to a relatively low voltage comprising switching circuit means formed from MOS transistors for selectively coupling said source of relatively high voltage to said display device in response to the application thereto of said relatively low voltage, said MOS transistors including two pairs of MOS transistors, the MOS transistors of each pair being connected in series along their respective source-drain paths through a connecting point, each pair of series-connected MOS transistors being further connected in series with said source of high voltage, the gate electrode of a first of the MOS transistors of each of said pairs being coupled to said relatively low voltage for switching thereby, the gate electrode of the second of the MOS transistors of each pair being connected to the connecting point of the other pair of said MOS transistors, said display device being connected to one of said connecting points in parallel with the source-drain path of the first transistor in series with said one connecting point.

2. A driving circuit as recited in claim 1, wherein said display device is a liquid crystal display device.

3. A driving circuit for selectively coupling a display device to a source of high voltage having a pair of terminals comprising switching circuit means including first and second inverter circuit means each formed from a pair of MOS transistors connected in the complementary symmetry configuration with their respective source-drain paths in series defining a connecting point therebetween, an input defined at the gate of a second of said pair of MOS transistors, and an output defined at said connecting point; each of said first and second inverter circuit means having its respective series source-drain path connected across the terminals of said source of relatively high voltage, the input of each of said first and second inverter circuit means being connected to the output of the other of said first and second inverter circuit means, said display device being connected between one of said connecting points and one of the terminals of said source of high voltage, a MOS transistor connected by its source and drain electrodes between the connecting point of each of said first and second circuit means and a terminal of said source of relatively high voltage; a source of relatively low voltage; and a third inverter circuit means formed from MOS transistors connected in a complementary symmetry configuration and having an input, an output and a series-connected source-drain path, said third inverter circuit means source-drain path being connected between the terminals of the source of said relatively low voltage, the gate electrode of each of a first of the MOS transistors connected in the respective source-drain path of each of said first and second inverter circuit means being coupled respectively to the input and output of said third inverter circuit means, the input of said third inverter circuit means being adapted to receive a driving signal for the excitation of said display device.

4. A driving circuit as recited in claim 1, wherein said display device is a liquid crystal display device.

* * * * *